United States Patent
Fritz et al.

(10) Patent No.: US 9,233,581 B2
(45) Date of Patent: Jan. 12, 2016

(54) TIRE CONDITION ADVISORY SYSTEM WITH OPTIMUM, ADVISORY AND WARNING STATES

(71) Applicant: NISSAN NORTH AMERICA, INC., Franklin, TN (US)

(72) Inventors: Scott Fritz, Farmington Hills, MI (US); Farokh Kavarana, Farmington Hills, MI (US); David Zdeb, Farmington Hills, MI (US); John DeYoung, Stanfield, AZ (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 180 days.

(21) Appl. No.: 14/097,569

(22) Filed: Dec. 5, 2013

(65) Prior Publication Data
US 2015/0158347 A1    Jun. 11, 2015

(51) Int. Cl.
*G08B 21/00* (2006.01)
*B60C 23/04* (2006.01)
*B29D 30/00* (2006.01)

(52) U.S. Cl.
CPC ......... *B60C 23/0408* (2013.01); *B60C 23/0401* (2013.01); *B29D 2030/0072* (2013.01)

(58) Field of Classification Search
CPC ............................ B60C 23/02; B60C 23/0401
USPC ............................ 340/438, 442, 449; 73/146, 73/146.2–146.8
See application file for complete search history.

(56) References Cited

U.S. PATENT DOCUMENTS

| | | | |
|---|---|---|---|
| 6,278,363 B1 | 8/2001 | Bezek et al. | |
| 7,013,721 B2 | 3/2006 | Keller et al. | |
| 7,132,938 B2* | 11/2006 | Suzuki | 340/442 |
| 7,658,099 B2 | 2/2010 | Corniot | |
| 2011/0012722 A1* | 1/2011 | Petrucelli et al. | 340/442 |
| 2012/0268263 A1* | 10/2012 | Lee et al. | 340/442 |

OTHER PUBLICATIONS

49 C.F.R. § 571.138 Ch. V (Oct. 1, 2011 Edition), 6 pp.
Grygier, Paul, et al., "An Evaluation of Existing Tire Pressure Monitoring Systems", US Department of Transportation, National Highway Traffic Safety Administration, Report No. DOT HS 809 297, Jul. 2001, 161 pp.

* cited by examiner

*Primary Examiner* — Jeffery Hofsass
(74) *Attorney, Agent, or Firm* — Young, Basile, Hanlon & MacFarlane, P.C.

(57) ABSTRACT

A display and a controller are used to implement a tire pressure optimization system for a vehicle. The controller is programmed to receive inflation pressure information indicative of a vehicle tire's inflation pressure, and identify an operating state of the vehicle as being in an optimum state when the inflation pressure information indicates optimum performance, in a warning state when the inflation pressure information indicates the inflation pressure is beyond a warning pressure threshold, or in an advisory state when the inflation pressure information indicates an undesirable performance characteristic outside of the warning state and the optimum state. The controller is programmed to operate the display to output an optimum state indication when the operating state is in the optimum state, a warning indication when the operating state is in the warning state, and an advisory indication when the operating state is in the advisory state.

17 Claims, 9 Drawing Sheets

US 9,233,581 B2

TIRE CONDITION ADVISORY SYSTEM WITH OPTIMUM, ADVISORY AND WARNING STATES

TECHNICAL FIELD

The embodiments disclosed herein generally relate to the monitoring of tire conditions in vehicles.

BACKGROUND

The United States National Highway Traffic Safety Administration (NHTSA) requires vehicle manufacturers to equip vehicles with a tire pressure monitoring system (TPMS) to detect when one or more of a vehicle's tires are significantly under inflated. Recommended tire inflation pressures are defined by the vehicle manufacturers and provided to drivers in the form of placards, usually located on the driver's side door. At present, the NHTSA requires the driver of a vehicle to be alerted with a telltale if the tire inflation pressure in one or more of the tires is below the higher of a pressure 25% below the vehicle manufacturer's placard pressure or a specified minimum pressure for the specific type of tire on the vehicle. The required telltale is commonly implemented in the form of a malfunction indicator light in the vehicle's instrument panel.

SUMMARY

Disclosed herein are embodiments for implementing a tire condition advisory system in a vehicle.

In one aspect, a tire pressure optimization system for a vehicle comprises: a display; and a controller in communication with the display, the controller programmed to: receive inflation pressure information indicative of a vehicle tire's inflation pressure, identify an operating state of the vehicle as being in an optimum state when the inflation pressure information indicates optimum performance, in a warning state when the inflation pressure information indicates the inflation pressure is beyond a warning pressure threshold, or in an advisory state when the inflation pressure information indicates an undesirable performance characteristic outside of the warning state and the optimum state, and operate the display to output an optimum state indication when the operating state is in the optimum state, a warning indication when the operating state is in the warning state, and an advisory indication when the operating state is in the advisory state.

In another aspect, a vehicle comprises: a tire; a device for detecting the tire's inflation pressure and communicate inflation pressure information indicative of the tire's inflation pressure; a display; and a controller in communication with the device and the display, the controller programmed to: identify an operating state of the vehicle as being in an optimum state when the inflation pressure information indicates optimum performance, in a warning state when the inflation pressure information indicates the inflation pressure is beyond a warning pressure threshold, or in an advisory state when the inflation pressure information indicates an undesirable performance characteristic outside of the warning state and the optimum state, and operate the display to output an optimum state indication when the operating state is in the optimum state, a warning indication when the operating state is in the warning state, and an advisory indication when the operating state is in the advisory state.

In another aspect, a vehicle comprises: a plurality of tires; a plurality of devices for detecting a tire's inflation pressure, each device associated with one of the plurality of tires and communicating inflation pressure information indicative of the associated tires' inflation pressures; a display; and a controller in communication with the plurality of devices, to receive the inflation pressure information, and the display, the controller programmed to: identify an operating state of each of the tires as being in an optimum state when the inflation pressure information indicates optimum performance, in a warning state when the inflation pressure information indicates the inflation pressure is beyond a warning pressure threshold, or in an advisory state when the inflation pressure information indicates an undesirable performance characteristic outside of the warning state and the optimum state, and operate the display to output, for each of the plurality of tires, an inflation pressure indication and an operating state indication including an optimum state indication when the operating state is in the optimum state, a warning indication when the operating state is in the warning state, and an advisory indication when the operating state is in the advisory state.

These and other aspects will be described in additional detail below.

BRIEF DESCRIPTION OF THE DRAWINGS

The various features, advantages and other uses of the present system and method will become more apparent by referring to the following detailed description and drawings in which.

DETAILED DESCRIPTION

Existing TPMS logic is responsive to a determination that one or more of a vehicle's tires are significantly under inflated. This disclosure describes examples of systems and methods for advising the operator of a vehicle, under conditions that would not call for the operator to be alerted under existing TPMS logic, that the vehicle is exhibiting undesirable performance characteristics because the inflation pressures in one or more of the vehicle's tires are outside of an optimum pressure range.

Figure 1:
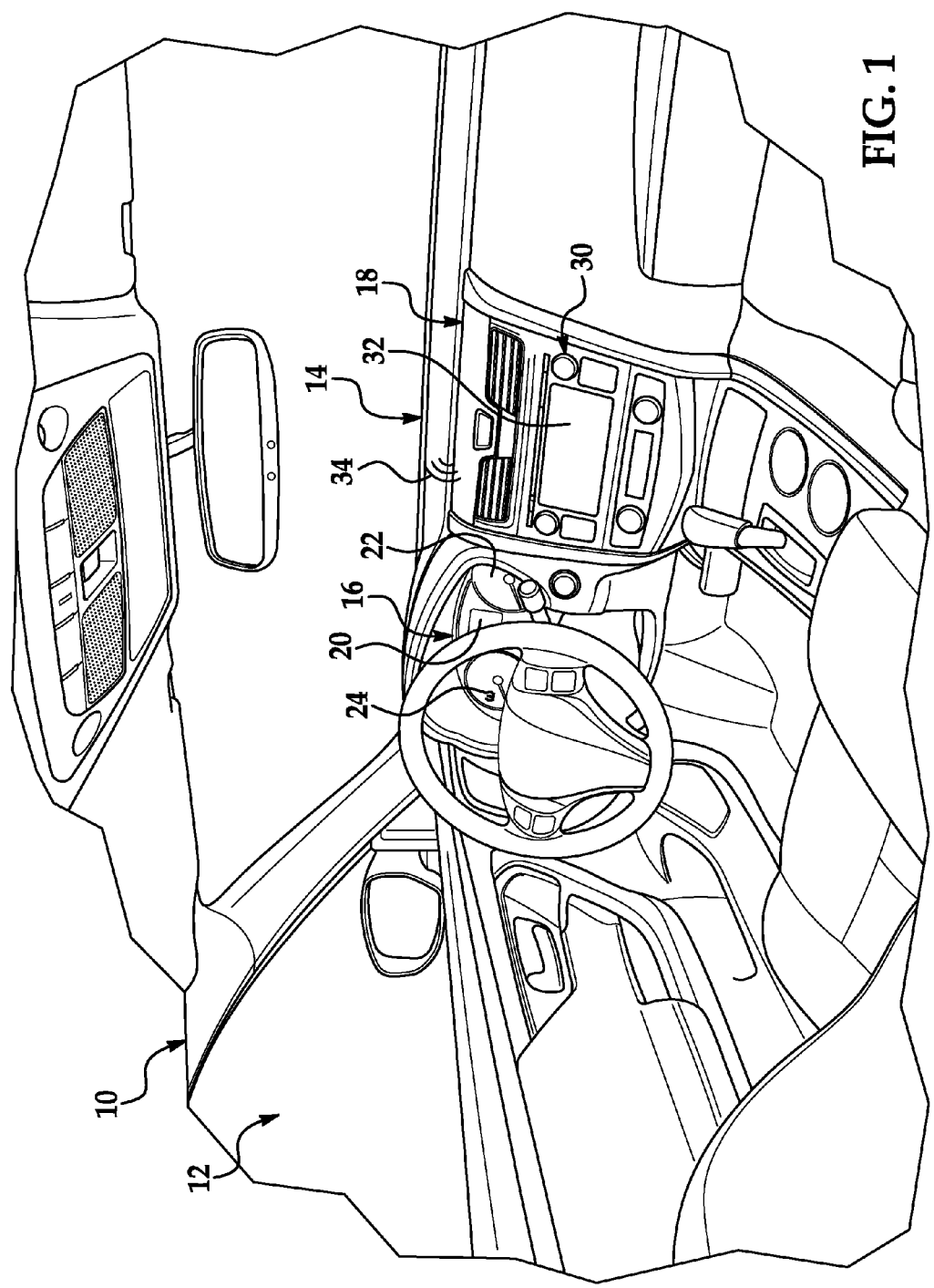
FIG. 1 is a perspective view of the passenger compartment of a vehicle.

FIG. 1 depicts a partial view of the front passenger compartment 12 of a vehicle 10. A dash 14 extends transversely across the vehicle 10 and serves as a forward boundary for the front passenger compartment 12. As shown, the dash 14 includes an instrument panel 16, and a center stack 18 extends downward from the dash 14.

The front passenger compartment 12 includes a number of features for presenting information to an operator or other user of the vehicle 10. For instance, as shown in FIG. 1, the instrument panel 16 includes among other components an electronic display 20, gauges 22 and a malfunction indicator light 24. In addition, an information/entertainment system 30 with another electronic display 32 is located in the center stack 18. Further, the front passenger compartment 12 can include one or more audio devices 34 for audibly presenting information to an operator or other user of the vehicle 10.

The gauges 22 are configured to indicate vehicle operating conditions including, for example, the rotation speed of an engine or motor powering the vehicle 10 and the speed at which the vehicle 10 is traveling. The illustrated malfunction indicator light 24 is a back lit indicator positioned on a gauge 22, but could be otherwise located in the field of view of an operator of the vehicle 10. The malfunction indicator light 24 could additionally or alternatively be implemented, for example, as a facsimile of a back lit indicator. For instance, in the illustrated vehicle 10, the malfunction indicator light 24 could be implemented in the display 20, the display 32 or another display.

Figure 2:
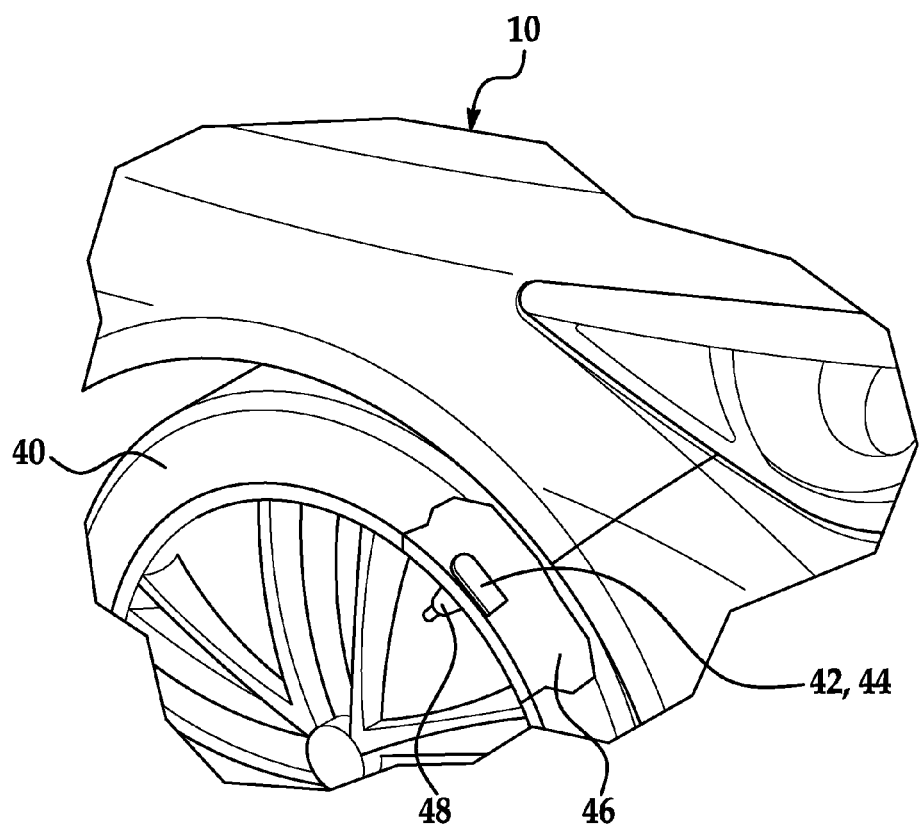
FIG. 2 is a partially cut away perspective view of one of the tires of the vehicle, showing an example of a device for detecting the tire's inflation pressure.

As discussed with additional reference to FIG. 2, the malfunction indicator light 24 can be illuminated or otherwise actuated in order to provide a warning to the operator of the vehicle 10 that concerns the inflation pressure in one or more of the vehicle's 10 pneumatic tires 40.

In this example, the malfunction indicator light 24 can operate in conjunction with a TPMS for the vehicle 10. In accordance with present regulations in the United States under the NHTSA, the vehicle 10 can include a TPMS configured to actuate the malfunction indicator light 24 or a similar telltale to provide a warning of low tire inflation pressure if the inflation pressure in any of the tires 40 is below the higher of a pressure 25% below a placard inflation pressure for the tire 40 (i.e., a recommended inflation pressure as defined by the manufacturer of the vehicle 10 and provided to the operator in the form of a placard, usually located on the driver's side door of the vehicle 10) or a minimum pressure specified for the tire 40 by the NHTSA. Although this TPMS logic is provided as one non-limiting example, it will be understood that a TPMS could be configured in accordance with other regulations in the United States, for example, or in accordance with the TPMS or similar regulations enacted by regulatory entities in different countries.

Figure 3:
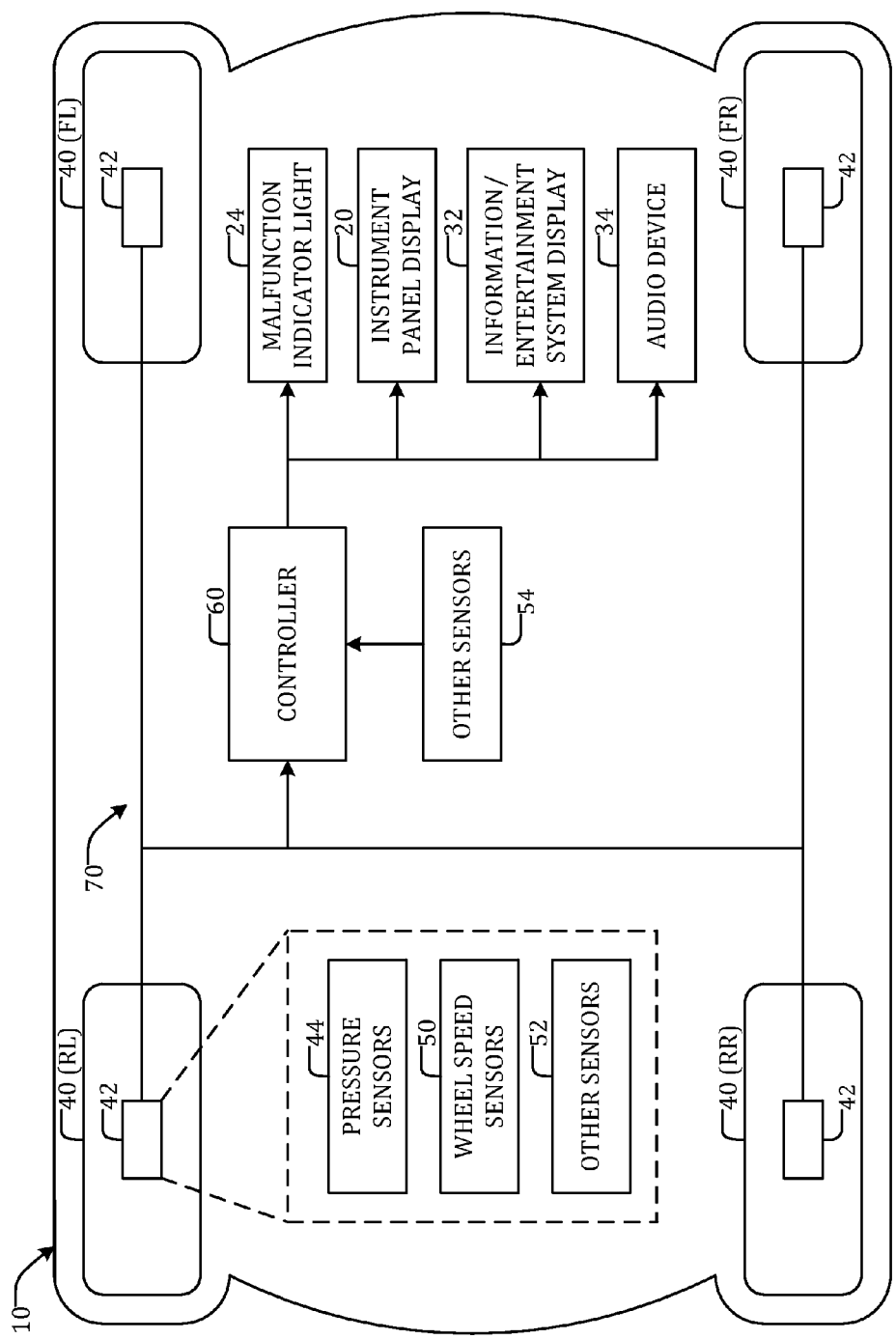
FIG. 3 is a block diagram showing a control system for reading the tire's inflation pressure and operating displays and audio output devices of the vehicle.

As shown with additional reference to FIG. 3, to implement a TPMS, the vehicle 10 can incorporate one or more tire pressure detection devices 42 for sensing or otherwise detecting the inflation pressures of one or more of a front left (FL) tire 40, a front right (FR) tire 40, a rear left (RL) tire 40 and a rear right (RR) tire 40. According to a common configuration of a so-called direct TPMS, for example, the vehicle 10 may be equipped with a pressure sensor 44 in each tire 40 for sensing the inflation pressures of each of the tires 40. Each pressure sensor 44 can be mounted on the wheel 46 of a respective tire 40, for example with a valve stem 48 as shown in FIG. 2, or otherwise in the tire 40. Alternatively, the vehicle 10 may be configured to employ a so-called indirect TPMS. In a common configuration of indirect TPMS, the inflation pressures of one, some or all of the tires 40 are inferred using input from wheel speed sensors 50 included in the ABS hardware for the vehicle 10, as indicated in FIG. 3.

The forgoing configurations of TPMS are described as non-limiting examples. In other implementations of TPMS, any manner of pressure sensors 44, wheel speed sensors 50 or other sensors 52, either alone or in any combination with each other or with other componentry, can be used in sensing or otherwise detecting the inflation pressures of one or more of the tires 40 of the vehicle 10. Below, the non-limiting examples of pressure sensors 44, wheel speed sensors 50, other sensors 52 and other applicable componentry are encompassed by the representative tire pressure detection devices 42.

As shown in FIG. 3, the display 20, the display 32, the audio device 34 and optionally the malfunction indicator light 24 are adaptable under the control of a controller 60. The controller 60 can control the output of the display 20, the display 32, the audio device 34 and optionally the malfunction indicator light 24 to implement a tire inflation pressure advisory system 70. As explained in additional detail below, the tire inflation pressure advisory system 70 can be used to identify an operating state of the vehicle 10 relating to the inflation pressure in one or more of the tires 40 and output indications relating to the identified operating state.

The logic for controlling the tire inflation pressure advisory system 70 is embodied in the controller 60. The controller 60 could be one or multiple microcomputers including a random access memory (RAM), a read-only memory (ROM) and a central processing unit (CPU) in addition to various input and output connections. Generally, the control functions described herein can be implemented by one or more software programs stored in internal or external memory and are performed by execution by the CPU. However, some or all of the functions could also be implemented by hardware components.

The controller 60 can be directly or indirectly communicatively coupled with the tire pressure detection devices 42 as generally shown. The controller 60 continually receives input signals originating from the tire pressure detection devices 42 indicative of the real-time inflation pressures for each of the tires 40 of the vehicle 10. For each of the input signals received from the tire pressure detection devices 42, the controller 60 may also receive an indication of which tire 40 of the vehicle 10 the input signal is associated with. This indication can be implicit in the input signals themselves, for example, or otherwise communicated to the controller 60. Alternatively, the tire 40 associated with the input signal can be identified using position detection through, for example, triangulation calculation using a detected signal strength of the tire pressure detection device 42.

The controller 60 monitors and evaluates the input signals from the tire pressure detection devices 42. In the illustrated example, the controller 60 can actuate the malfunction indicator light 24 in order to implement a TPMS for the vehicle 10 as a part of the overall tire inflation pressure advisory system 70. In this example, if the malfunction indicator light 24 is the illustrated back lit indicator, the controller 60 can actuate the malfunction indicator light 24 by causing it to be illuminated. However, it will be understood that the controller 60 can actuate additional or alternative malfunction indicator lights 24 implemented, for example, in the display 20, the display 32 or another display.

Irrespective of whether the TPMS for the vehicle 10 is implemented by the controller 60 as a part of the overall tire inflation pressure advisory system 70, it is contemplated that the tire pressure detection devices 42 can be those associated with the TPMS. In this manner, existing equipment of the vehicle 10 can be used to implement the tire inflation pressure advisory system 70. In alternative examples, however, the vehicle 10 could be equipped with additional non-TPMS-related tire pressure detection devices 42 for sensing or otherwise detecting the inflation pressures of one or more of the tires 40.

As shown, the controller 60 is further communicatively coupled with one or more of the display 20, the display 32 and the audio device 34. The displays 20 and 32 are representative and non-limiting examples of devices adaptable under the control of the controller 60 to output information to an operator of the vehicle 10 in a visible format. Although each of the displays 20 and 32 are shown as a singular displays, the display 20 and/or the display 32 could be embodied in multiple discrete displays, for example. The display functions described herein could be performed using either one of the displays 20 and 32 individually, or using both of the displays 20 and 32 in combination. In alternative examples, some or all of the display functions could be performed using a so-called heads up display, for instance.

The audio device 34 is similarly a representative and non-limiting example of a device adaptable under the control of the controller 60 to output information to an operator of the vehicle 10 in an audible format. The audio device 34 could be one or more speakers, for example, associated with the information/entertainment system 30. The audible functions described herein could be performed individually or in combination with the display functions described with reference to the displays 20 and 32.

In operation of the tire inflation pressure advisory system 70, for each of the tires 40 of the vehicle 10, the controller 60 identifies the vehicle 10 as being in one of a warning state, an advisory state or an optimum state with respect to the tire 40 based on the detected inflation pressure for the tire 40. In addition, the controller 60 can control the display 20, the display 32, the audio device 34 and/or the malfunction indicator light 24 to selectively provide to an operator of the vehicle 10 information pertaining to the inflation pressures of the tire 40 and indications concerning the identified state of the vehicle 10, along with other information.

Figure 4:
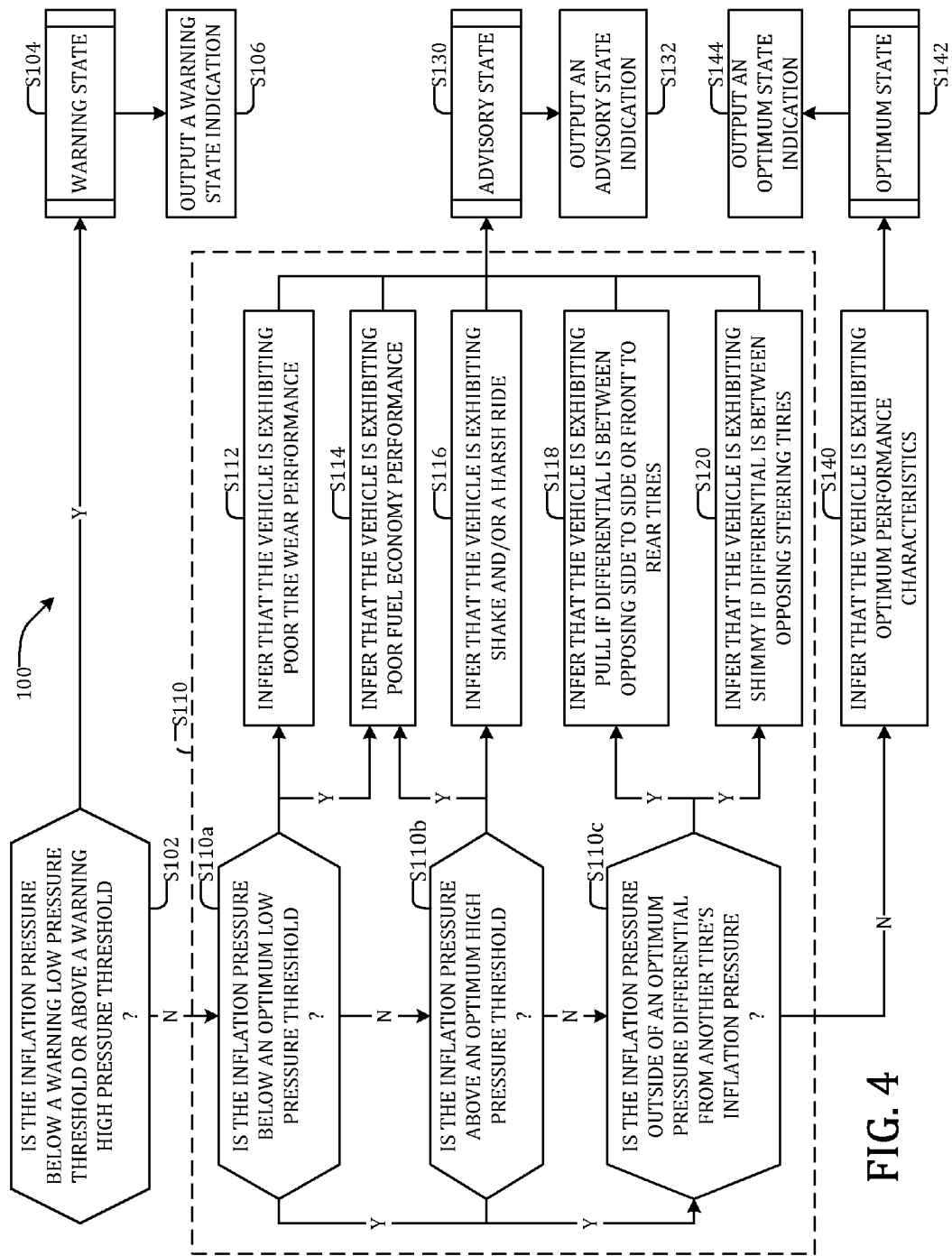
FIG. 4 is a flow diagram depicting operations of a tire inflation pressure advisory system for identifying whether the vehicle is in a warning state, an advisory state or an optimum state based on the inflation pressures detected for the tires, and for outputting indications relating to the identified state.

An exemplary process 100 for implementing the tire inflation pressure advisory system 70 is shown in FIG. 4. Although the process 100 is explained for simplicity with respect to a single one of the tires 40 of the vehicle 10, it will be understood that the operations of the process 100 are applicable to each of the tires 40. The following examples assume that a placard inflation pressure P for the tire 40 is 35 pounds per square inch (psi). However, this is given as a representative and non-limiting example that could vary depending upon the particular vehicle 10 and/or tire 40. The examples as needed also assume previous or concurrent detection of the inflation pressures of one or more of the other tires 40 of the vehicle 10.

The process 100 is explained with reference to FIG. 5, which illustrates a tire inflation pressure map with non-limiting examples of a warning, advisory and an optimum pressure ranges for the inflation pressures of the tire 40. The warning pressure range, the advisory pressure range and the optimum pressure range respectively correspond to the warning state, the advisory state and the optimum state of the vehicle 10. That is, if the controller 60 recognizes that the inflation pressure of the tire 40 is in the warning pressure range, the controller 60 will identify the vehicle 10 as being in the warning state with respect to the tire 40, if the controller 60 recognizes that the inflation pressure of the tire 40 is in the advisory pressure range, the controller 60 will identify the vehicle 10 as being in the advisory state with respect to the tire 40, and if the controller 60 recognizes that the inflation pressure of the tire 40 is in the optimum pressure range, the controller 60 will identify the vehicle 10 as being in the optimum state with respect to the tire 40.

The warning pressure range, the advisory pressure range and the optimum pressure range can each be defined based on regulatory and/or performance criteria for the vehicle 10. According to the tire inflation pressure map of FIG. 5 and the examples that follow, these criteria can be constructed to consider the detected inflation pressure for the tire 40 either alone or in combination with the detected inflation pressures of one or more other tires 40 of the vehicle 10. In FIG. 5, inflation pressures for the tire 40 are mapped on the vertical axis, while differentials between an inflation pressure of the tire 40 and the inflation pressure of another tire 40 on the vehicle 10 are mapped on the horizontal axis. One example of such a differential pressure includes the differential between an inflation pressure of a tire 40 on one side of the vehicle 10 and an inflation pressure of another tire 40 on the opposing side of the vehicle 10. Another example of such a differential includes the differential between an inflation pressure of a tire 40 on a forward end of the vehicle 10 and an inflation pressure of a tire 40 on the rearward end of the vehicle 10.

Figure 5:
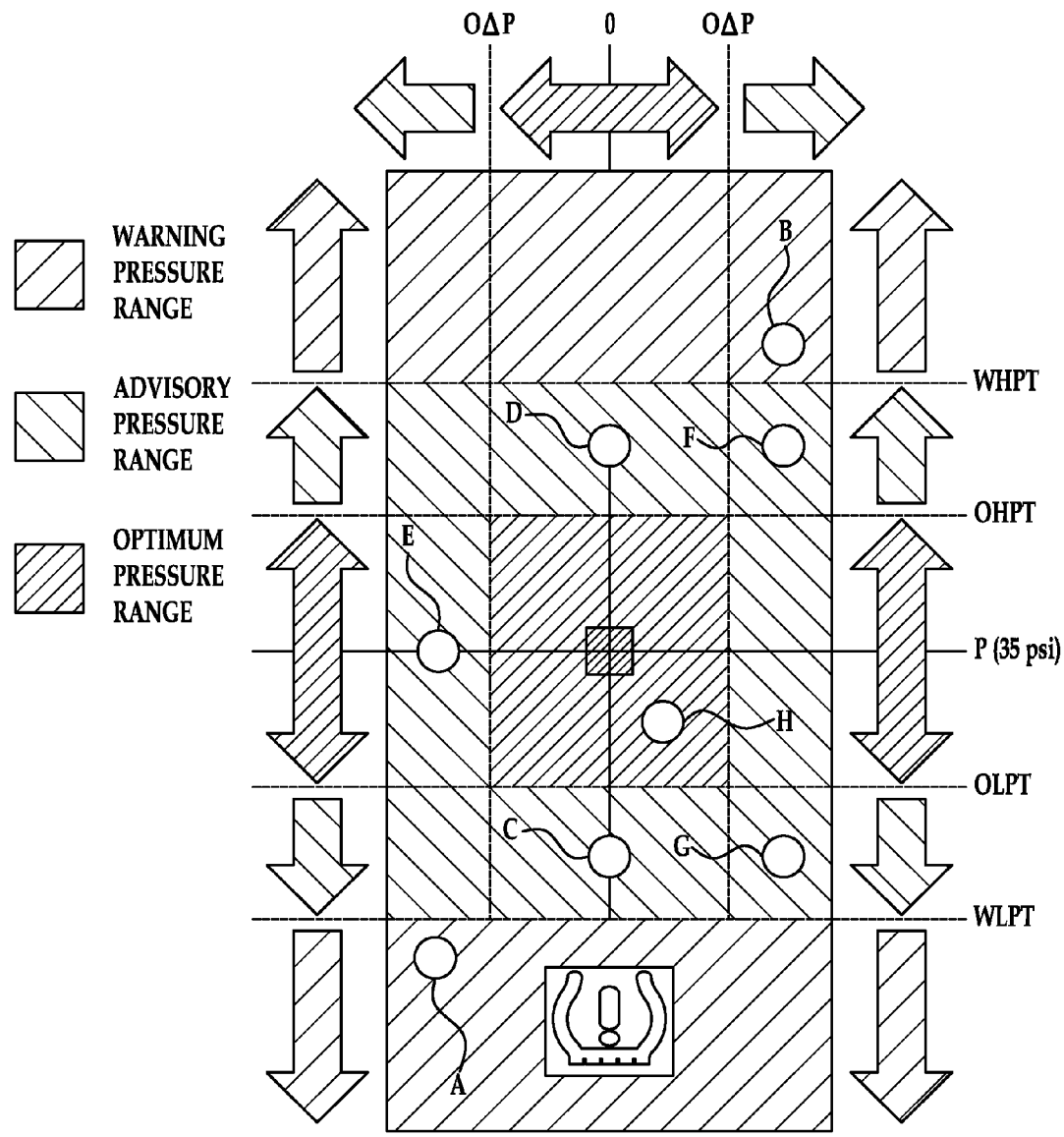
FIG. 5 is a representation of an example tire inflation pressure map for identifying whether the vehicle is in the warning state, the advisory state or the optimum state with respect to a particular tire according to the flow diagram of FIG. 4.

It can be seen from the tire inflation pressure map in FIG. 5 and the examples that follow that the warning pressure range, the advisory pressure range and the optimum pressure range may include, but are not limited to including, only one set of continuous inflation pressures or other values. Instead, in some examples, multiple sets of inflation pressures or other values can be included depending, for instance, on the amount of criteria constructed to define the respective warning pressure range, the advisory pressure range and the optimum pressure range. According to the non-limiting examples herein, the sets of inflation pressures or other values can generally be closed or open ended continuous sets. However, it will be understood that in other examples the sets of inflation pressures or other values could alternatively be non-continuous, for instance.

In addition, it can be seen that the advisory pressure range in the non-limiting examples can be multidimensional if, for instance, multiple criteria with differing units are constructed to define the advisory pressure range. It can similarly be seen that the optimum pressure range in the non-limiting examples can be multidimensional if multiple criteria with differing units are constructed to define the optimum pressure range. Although the warning pressure range in the non-limiting examples is generally defined in a single dimension, it will be understood that in other examples the warning pressure range could alternatively be multidimensional.

In general, the warning pressure range is defined to include at least any inflation pressures of the tire 40 that are below a warning low pressure threshold WLPT set according to the above described or other TPMS logic. That is, the warning pressure range is defined to include any inflation pressures of the tire 40 that require a warning of low tire inflation pressure under TPMS regulations. For instance, according to existing TPMS regulations in the United States under the NHTSA, for the given example of the tire 40 with a placard inflation pressure P of 35 psi, the warning low pressure threshold WLPT would be the higher of 26.25 psi (i.e., 25% below the placard inflation pressure P) or the minimum pressure specified for the tire 40 by the NHTSA. As shown, the warning pressure range can optionally be defined to additionally include any inflation pressures of the tire 40 that are above a warning high pressure threshold WHPT. The warning high pressure threshold WHPT may for example represent an upper limit for the inflation pressure of the tire 40. For the given example of the tire 40 with a placard inflation pressure P of 35 psi, for instance, the warning high pressure threshold WHPT could be approximately 63.5 psi. The warning high pressure threshold WHPT could alternatively represent an upper limit to the detection capability of the pressure sensor 44, such that an error condition is indicated if the inflation pressure of the tire 40 is above the detection capability of the pressure sensor 44.

The optimum pressure range includes inflation pressures of the tire 40 that fall outside of the warning pressure range, and that will not cause the vehicle 10 to exhibit undesirable performance characteristics. That is, if the inflation pressures of the tires 40 are in the optimum range, the vehicle 10 will exhibit optimum performance characteristics.

The advisory pressure range is shown and explained with corresponding reference to the optimum pressure range. The advisory pressure range, like the optimum pressure range, includes inflation pressures of the tire 40 that fall outside of the warning pressure range. However, unlike the optimum pressure range, the advisory pressure range includes inflation pressures of the tire 40 that will, either alone or in combination with the inflation pressures of one or more other tires 40 of the vehicle 10, cause the vehicle 10 to exhibit one or more undesirable performance characteristics. These undesirable performance characteristics may include, for example, undesirable ride characteristics, such as shake, a harsh ride, drift/pull or shimmy; an undesirable efficiency characteristic, such as poor fuel economy performance; or an undesirable tire wear characteristic, such as poor tire wear performance.

The demarcation between the optimum pressure range and the advisory pressure range can generally be determined based on the sensitivity of the vehicle 10 to exhibit one or more of the above described or other undesirable performance characteristics when the inflation pressure of the tire 40 varies from the placard inflation pressure P and/or from the inflation pressure of another tire 40 of the vehicle 10.

In the example of FIG. 5, the advisory pressure range is defined to include any inflation pressures of the tire 40 that are above the warning low pressure threshold WLPT but below an optimum low pressure threshold OLPT. The optimum low pressure threshold OLPT can be set below the placard inflation pressure P considering, for example, that the vehicle 10 will exhibit poor fuel economy performance and/or poor tire wear performance if the inflation pressure of the tire 40 is below the optimum low pressure threshold OLPT.

The example advisory pressure range is also defined to include any inflation pressures of the tire 40 that are below the warning high pressure threshold WHPT but above an optimum high pressure threshold OHPT. The optimum high pressure threshold OHPT can be set above the placard inflation pressure P considering, for example, that the vehicle 10 will exhibit poor fuel economy performance, shake, and/or a harsh ride if the inflation pressure of the tire 40 is above the optimum high pressure threshold OHPT.

The example advisory pressure range is further defined to include any inflation pressures of the tire 40 that are outside of an optimum pressure differential OΔP from the inflation pressure of another tire 40 on the vehicle 10, such as a tire 40 on an opposing side of the vehicle 10. The optimum pressure differential OΔP can be set considering, for example, that the vehicle 10 will exhibit drift or pull if the inflation pressure of the tire 40 is outside of the optimum pressure differential OΔP from the inflation pressure of another tire 40 on the vehicle 10 (e.g. if the inflation pressure of the FL tire 40 is outside of the optimum pressure differential OΔP from the inflation pressure of the FR tire 40, or if the inflation pressure of the RL tire 40 is outside of the optimum pressure differential OΔP from the inflation pressure of the RR tire 40). The optimum pressure differential OΔP can further be set considering, for example, that the vehicle 10 will exhibit shimmy, or oscillation, if the if the differential between the inflation pressures of two opposing steering tires 40 (e.g., the FL tire 40 and the FR tire 40) is outside of the optimum pressure differential OΔP.

The values of the optimum low pressure threshold OLPT, the optimum high pressure threshold OHPT and the optimum pressure differential OΔP can be determined based on a predetermined and/or heuristic evaluation of the sensitivity of the vehicle 10 to exhibit particular undesirable performance characteristics based on the inflation pressures of one or more of the tires 40. For the given example of the tire 40, for instance, the optimum low pressure threshold OLPT could be approximately 5 psi below the placard inflation pressure P of 35 psi, or 30 psi, the optimum high pressure threshold OHPT could be approximately 5 psi above the placard inflation pressure P of 35 psi, or 40 psi, and the optimum pressure differential OΔP could be approximately ±3 psi from the inflation pressure of the tire 40 to the inflation pressure of another tire 40 on the vehicle 10.

It will be understood that the illustrated and described advisory pressure range is a non-limiting example. In other examples, the advisory pressure range can be defined with different values for the optimum low pressure threshold OLPT, the optimum high pressure threshold OHPT, the optimum pressure differential OΔP, the warning low pressure threshold WLPT, and/or the warning high pressure threshold WHPT. In other examples, the advisory pressure range can be defined without reference to one or more of the optimum low pressure threshold OLPT, the optimum high pressure threshold OHPT and the optimum pressure differential OΔP. In yet other examples, the advisory pressure range can be defined with reference to other thresholds or differentials set in consideration of additional and/or alternative undesirable performance characteristics from those specifically described.

In operation S102 of the process 100, it is determined whether the inflation pressure of the tire 40 is beyond a warning pressure threshold. If the inflation pressure of the tire 40 is determined to be below the warning low pressure threshold WLPT (or optionally above the warning high pressure threshold WHPT), the inflation pressure of the tire 40 is recognized as being in the warning pressure range, and in operation S104, the vehicle 10 is identified as being in the warning state.

As shown in FIG. 5, an example inflation pressure A of the tire 40 is in the warning pressure range for being below the warning low pressure threshold WLPT, and an example inflation pressure B is in the warning pressure range for being above the warning high pressure threshold WHPT. In the example process 100, it can be seen that the although the inflation pressures A and B of the tire 40 may additionally be characteristic of the advisory pressure range in one or more ways (e.g., the inflation pressures A and B may be below the optimum low pressure threshold OLPT, above the optimum high pressure threshold OHPT, and/or outside of the optimum pressure differential OΔP from the inflation pressure of another tire 40 on the vehicle 10, as explained below), the vehicle 10 will only be identified as being in the warning state, and not the advisory state, if any of the conditions of operation S102 is satisfied. If the vehicle 10 is identified as being in the warning state in operation S104, the malfunction indicator light 24 and optionally the display 20, the display 32 and/or the audio device 34 are controlled to output a warning state indication in operation S106, as explained in additional detail below.

If the inflation pressure of the tire 40 is recognized as being outside of the warning pressure range, in operation S110, it is determined whether the inflation pressure of the tire 40 is nonetheless outside of the optimum pressure range where the vehicle 10 will exhibit optimum performance. That is, it is determined in operation S110 whether the inflation pressure of the tire 40 is within the advisory pressure range where the inflation pressure of the tire 40 will, either alone or in combination with the inflation pressures of one or more other tires 40 of the vehicle 10, cause the vehicle 10 to exhibit one or more undesirable performance characteristics.

The inflation pressure of the tire 40 can be, for example, recognized as being in the advisory pressure range in operation S110a if the inflation pressure of the tire 40 is below the optimum low pressure threshold OLPT. As shown in FIG. 5, an example inflation pressure C of the tire 40 is in the advisory pressure range for being below the optimum low pressure threshold OLPT. If the inflation pressure of the tire 40 is recognized as being in the advisory pressure range for being below the optimum low pressure threshold OLPT in operation S110a, it can be inferred in operation S112 that the vehicle 10 is exhibiting poor tire wear performance, and/or it can be inferred in operation S114 that the vehicle 10 is exhibiting poor fuel economy performance.

The inflation pressure of the tire 40 can also be recognized as being in the advisory pressure range in operation S110b if the inflation pressure of the tire 40 is above the optimum high pressure threshold OHPT. As shown in FIG. 5, an example inflation pressure D of the tire 40 is in the advisory pressure range for being above the optimum high pressure threshold OHPT. If the inflation pressure of the tire 40 is recognized as being in the advisory pressure range for being above the optimum high pressure threshold OHPT in operation S110b, it can be inferred in operation S114 that the vehicle 10 is exhibiting poor fuel economy performance, and/or it can be inferred in operation S116 that the vehicle 10 is exhibiting shake and/or a harsh ride.

The inflation pressure of the tire 40 can also be recognized as being in the advisory pressure range in operation S110c if the inflation pressure of the tire 40 is outside of the optimum pressure differential O$\Delta$P from the inflation pressure of another tire 40 on the vehicle 10. As shown in FIG. 5, an example inflation pressure E of the tire 40 is in the advisory pressure range for being outside of the optimum pressure differential O$\Delta$P from the inflation pressure of an opposing tire 40. In operation S118, it can be inferred that the vehicle 10 is exhibiting drift or pull if the inflation pressure of opposing side to side tires (e.g., FL tire 40 and FR tire 40, or RL tire 40 and RR tire 40) or opposing front to rear tires (e.g., FL tire 40 and RL tire 40, or FR tire 40 and RR tire 40) are outside of the optimum pressure differential O$\Delta$P. In addition, it can be inferred in operation S120 that the vehicle 10 is exhibiting shimmy if the differential between the inflation pressures of two opposing steering tires 40 (e.g., the FL tire 40 and the FR tire 40) is outside of the optimum pressure differential O$\Delta$P.

If any of the conditions of operations S110a-c is satisfied, in addition to drawing inferences that the vehicle 10 is exhibiting one or more undesirable performance characteristics in operations S112-S120, the inflation pressure of the tire 40 is recognized as being in the advisory pressure range, and in operation S130, the vehicle 10 is identified as being in the advisory state.

In the process 100, it can be seen that the although the example inflation pressures C, D and E of the tire 40 may be uncharacteristic of the advisory pressure range in one or more ways, the vehicle 10 will still be identified as being in the advisory state if any of the conditions of operations S110a-c is satisfied. For instance, as shown in FIG. 5, the inflation pressure C of the tire 40 is in the advisory pressure range for being below the optimum low pressure threshold OLPT, despite being within the optimum pressure differential O$\Delta$P from the inflation pressure of another tire 40 on the vehicle 10. Further, the inflation pressure D of the tire 40, although likewise within the optimum pressure differential O$\Delta$P from the inflation pressure of another tire 40 on the vehicle 10, is in the advisory pressure range for being above the optimum high pressure threshold OHPT. In addition, the inflation pressure E of the tire 40, despite being at the placard inflation pressure P, is in the advisory pressure range for being outside of the optimum pressure differential O$\Delta$P from the inflation pressure of an opposing tire 40.

It will also be understood that the conditions of operations S110a-c may be considered in parallel, for example, where the satisfaction of one condition for recognizing the inflation pressure of the tire 40 as being in the advisory pressure range does not preclude the satisfaction of one or more other conditions for recognizing the inflation pressure of the tire 40 as being in the advisory pressure range. For instance, as shown in FIG. 5 and described by the flow of operations S110a-c in FIG. 4, an example inflation pressure F of the tire 40 could be recognized as being in the advisory range both for being above the optimum high pressure threshold OHPT and for being outside of the optimum pressure differential O$\Delta$P from the inflation pressure of another tire 40 on the vehicle 10. Similarly, an example inflation pressure G of the tire 40 could be recognized as being in the advisory range both for being below the optimum low pressure threshold OLPT and for being outside of the optimum pressure differential O$\Delta$P from the inflation pressure of another tire 40 on the vehicle 10. In these and similar examples where an inflation pressure of the tire 40 is characteristic of the advisory pressure range in multiple ways, corresponding multiple inferences can be drawn concerning undesirable performance characteristic that the vehicle 10 is exhibiting, as generally shown.

The above control in operations S110a-c and/or operations S112-S120 can optionally be combined with detection that the vehicle 10 is exhibiting one or more undesirable performance characteristics. Detection of the undesirable performance characteristics can be performed, for example, with other sensors 54 on the vehicle, such as accelerometers, steering angle sensors, and yaw moment sensors. In this example, for instance, a detected undesirable performance characteristic could be used as confirmation of an inference that the vehicle 10 is exhibiting the particular undesirable performance characteristic. Alternatively, a particular detected undesirable performance characteristic can be correlated against the inflation pressures of the tires 40 to infer which tire inflation pressures of the tires 40, if any, are causing the vehicle 10 to exhibit the detected undesirable performance characteristic.

If the vehicle 10 is identified as being in the advisory state in operation S130, the display 20, the display 32 and/or the audio device 34 are controlled to output an advisory state indication in operation S132, as explained in additional detail below.

If none of the conditions of operations S102 and S110 for identifying the vehicle 10 as being in the warning state or the advisory state is satisfied, the inflation pressure of the tire 40 is recognized as being in the optimum pressure range. As shown in FIG. 5, an example inflation pressure H of the tire 40 is in the optimum pressure range. Although the inflation pressure H of the tire 40 is below the placard inflation pressure P and varies from the inflation pressure of another tire 40 on the vehicle 10 as shown, the inflation pressure H is in the optimum pressure range because none of the conditions of operations S102 and S110 for identifying the vehicle 10 as being in either the warning state or the advisory state is satisfied. If the inflation pressure of the tire 40 is recognized as being in the optimum pressure range, in operation S140 it can be inferred that the vehicle 10 is exhibiting optimum performance with respect to the tire 40, and in operation S142, the vehicle 10 is identified as being in the optimum state. If the vehicle 10 is identified as being in the optimum state in operation S142, the display 20, the display 32 and/or the audio device 34 are controlled to output an optimum state indication in operation S144, as explained in additional detail below.

Following the determination that the operating state of the vehicle 10 is in one of the warning state, the advisory state or the optimum state, the tire inflation pressure advisory system 70 can provide appropriate feedback or other information to an operator of the vehicle 10 concerning the inflation pressures of the tires 40, including the actions required, if any, to ensure that the vehicle 10 is exhibiting optimum performance with respect to the inflation pressures of the tires 40.

Figure 6:
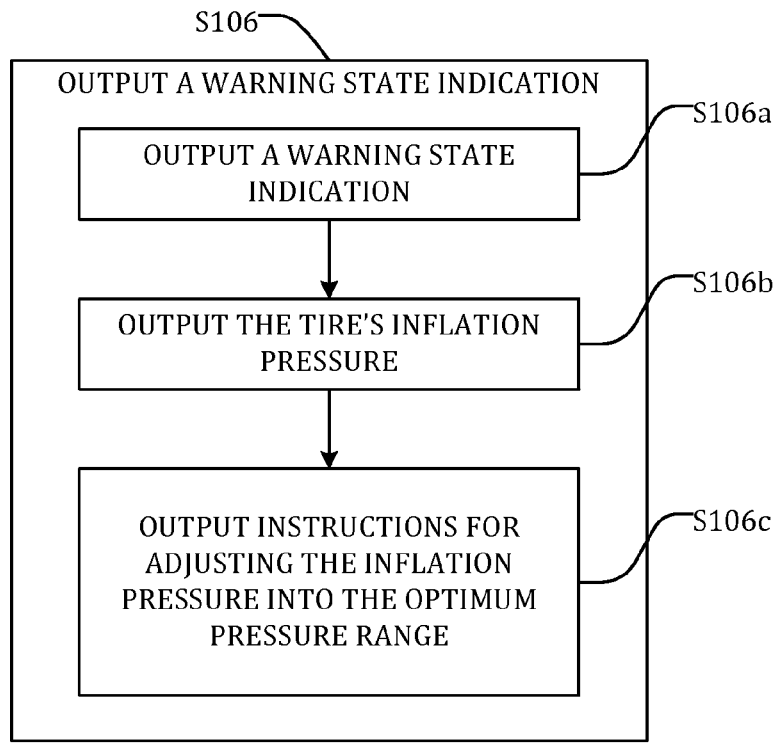
FIG. 6 is a flow diagram depicting operations for outputting a warning state indication when the vehicle is identified as being in the warning state.

For example, if the vehicle 10 is identified as being in the warning state, in operation S106, the malfunction indicator light 24 and optionally the display 20, the display 32 and/or the audio device 34 can be controlled to output a warning state indication in operation 106a. In addition to outputting the indication that the vehicle 10 is in the warning state, as shown in FIG. 6, the warning state indication can include actuation of the malfunction indicator light 24 in accordance with a TPMS when the inflation pressure is below the warning low pressure threshold WLPT. Alternatively, the warning state indication can include an error state indication when the inflation pressure is above the warning high pressure threshold WHPT. Otherwise, the warning state indication can include an indication associated with a low pressure when the inflation pressure is below the warning low pressure threshold WLPT or a high pressure when the inflation pressure is above the warning high pressure threshold WHPT. The warning state indication can further optionally include, for example, outputting the inflation pressure of the tire 40 in operation S106b and/or instructions for adjusting the inflation pressure of the tire 40 into the optimum pressure range in S106c, so that the vehicle 10 will exhibit optimum performance according to the optimum state.

Figure 7:
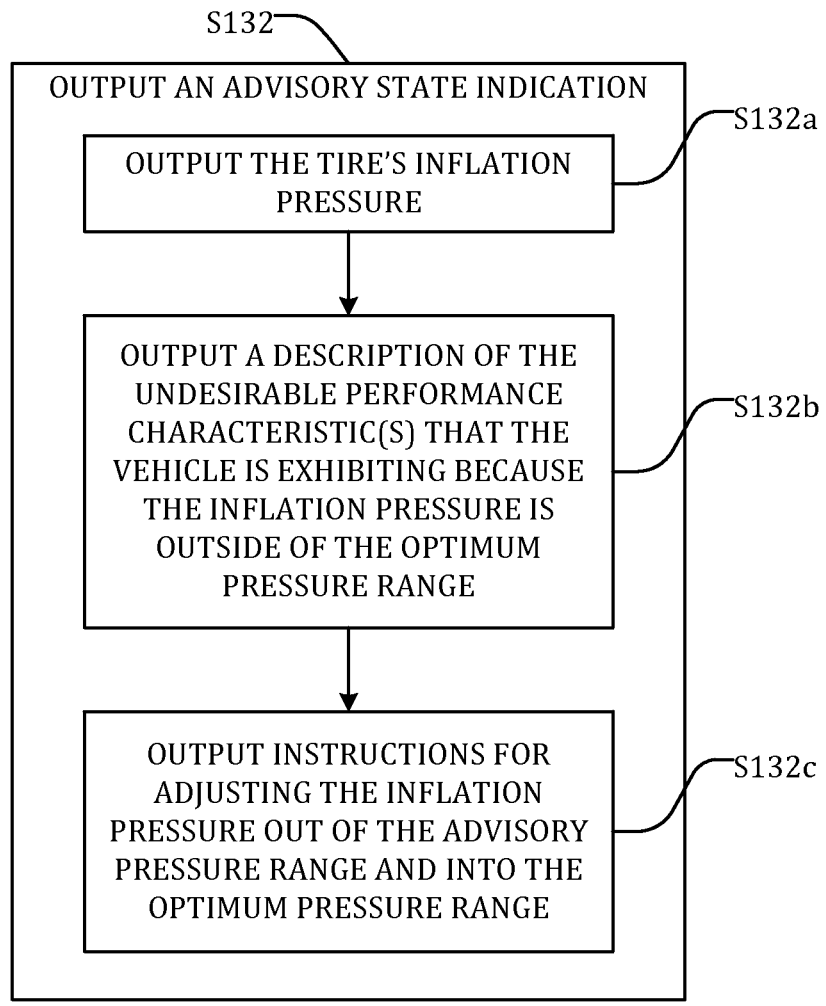
FIG. 7 is a flow diagram depicting operations for outputting an advisory state indication when the vehicle is identified as being in the advisory state.

Similarly, if the vehicle 10 is identified as being in the advisory state, the display 20, the display 32 and/or the audio device 34 can be controlled to output an advisory state indication in operation S132. In addition to outputting an indication that the vehicle 10 is in the advisory state, as shown in FIG. 7, the advisory state indication can include, for example, outputting the inflation pressure of the tire 40 in operation S132a, a description of the one or more undesirable performance characteristics that the vehicle is exhibiting because the inflation pressure of the tire 40 is outside of the optimum pressure range and within the advisory pressure range in operation 132b, and/or instructions for adjusting the inflation pressure of the tire 40 into the optimum pressure range in S132c, so that the vehicle 10 will exhibit optimum performance according to the optimum state.

Figure 8:
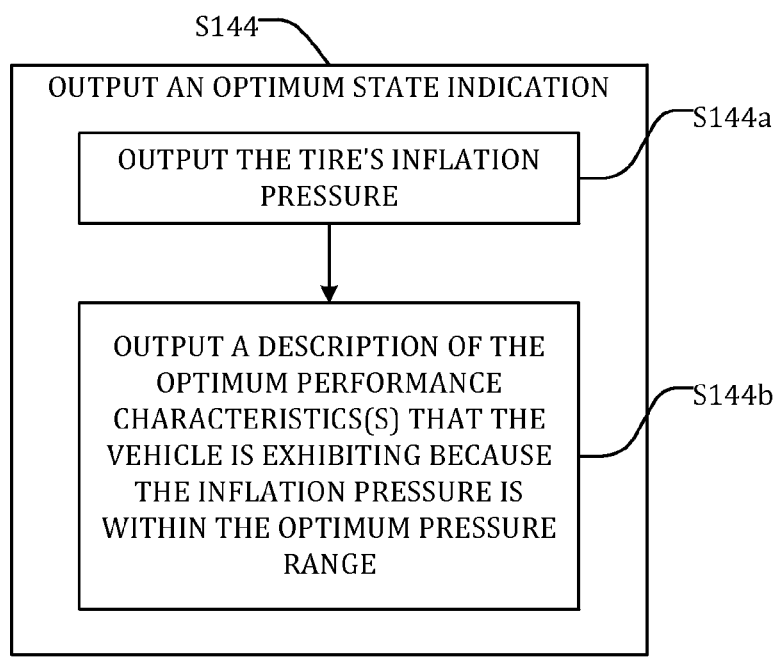
FIG. 8 is a flow diagram depicting operations for outputting an optimum state indication when the vehicle is identified as being in the optimum state.

Further, as shown in FIG. 8, if the vehicle 10 is identified as being in the optimum state, the display 20, the display 32 and/or the audio device 34 can be controlled to output an optimum state indication according to operation S144. It will be understood that in one example, the optimum state indication can be output according to operation S144 through the absence of a warning state indication according to operation S106 or an advisory state indication according to operation S132. In addition to outputting an indication that the vehicle 10 is in the optimum state, the optimum state indication can include, for example, outputting the inflation pressure of the tire 40 in operation S144a and/or a description of the one or more optimum performance characteristics that the vehicle is exhibiting because the inflation pressure of the tire 40 is within the optimum pressure range in S144b.

Examples of configurations for the displays 20 and 32 in accordance with operations S106, S132 and S144 are shown in FIGS. 9-12. Although only example configurations for the displays 20 and 32 are depicted, it will be understood that some or all of the information output at the displays 20 and 32 can additionally or alternatively be output with the audio device 34.

According to the examples, the displays 20 and 32 can collectively or individually be adapted to include one or both of a first field 200a and a second field 200b for outputting one or more aspects of the warning state indication, the advisory state indication and the optimum state indication described above. It will be understood that the displays 20 and 32 can be adapted to include either one of the first field 200a and the second field 200b, or both the first field 200a and the second field 200b. If the displays 20 and 32 are adapted to include both the first field 200a and the second field 200b, the first field 200a and the second field 200b could be selectively included concurrently, for example, or sequentially at the request of an operator of the vehicle 10.

As shown throughout FIGS. 9-12, the first field 200a may be divided into sectors 202 corresponding to the tires of the vehicle 10. In particular, according to an example of a common passenger vehicle, the first field 200a contains four sectors 202 corresponding to a respective FL, a FR, a RL and a RR tire 40. As shown, each sector 202 includes a background display 204 that can show different color hues, patterns or other indications to output whether the vehicle 10 is in the warning state, the advisory state or the optimum state with respect to a particular tire 40 of the vehicle 10.

In one non-limiting example, for instance, the background display 204 can be controlled to show a red hue in accordance with operation S106 to indicate that the vehicle 10 is in the warning state with respect to a particular tire 40, or to show a yellow hue in accordance with operation S132 to indicate that the vehicle 10 is in the advisory state with respect to a particular tire 40. The background display 204 could be controlled to show a standard background hue for the displays 20 and 32, for example, to indicate that the vehicle 10 is in the optimum state with respect to a particular tire 40. In this manner, following the non-limiting example above, the optimum state indication can be output in accordance with operation S144 through the absence of showing a red hue to indicate that the vehicle 10 is in the warning state with respect to the particular tire 40 or showing a yellow hue to indicate that the vehicle 10 is in the advisory state with respect to the particular tire 40. Alternatively, the background display 204 could be controlled to show a green or other hue particular to the optimum state in accordance with operation S144 to indicate that the vehicle 10 is in the optimum state with respect to a particular tire 40.

In addition, each of the sectors 202 can show a numeric value 206 to output the inflation pressure of a corresponding tire 40 in the foreground of the background display 204, in accordance with operations S106b, S132a and S144a.

Figure 10:
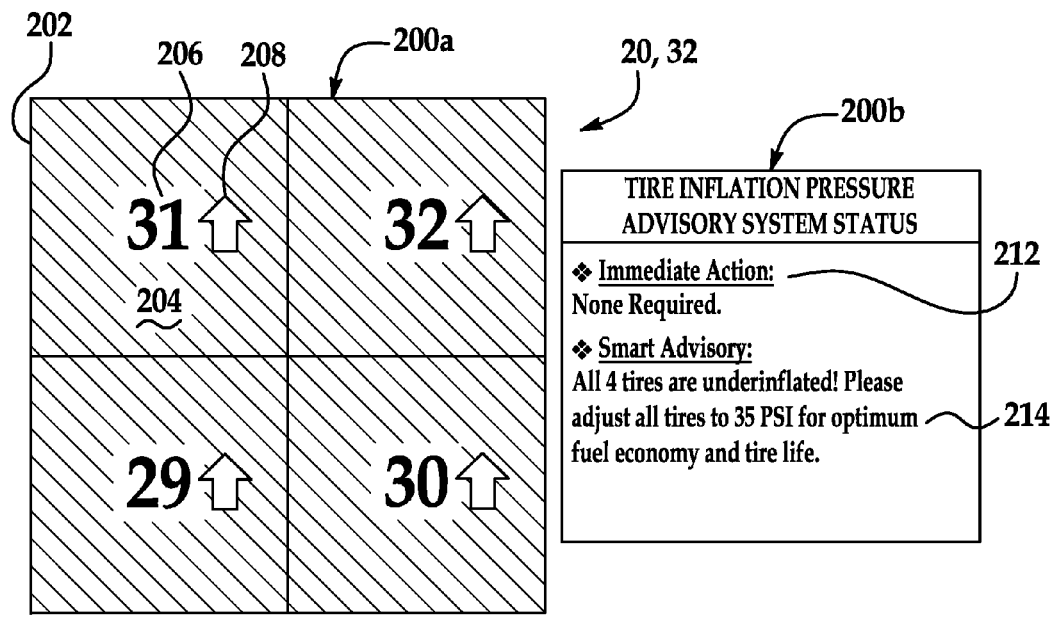
Figure 11:
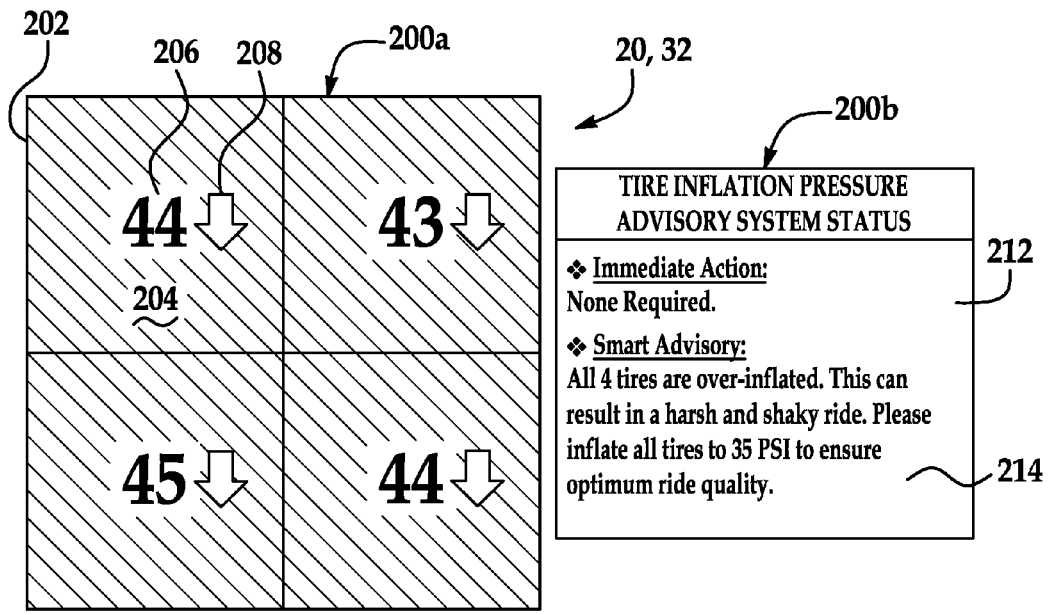
Figure 12:
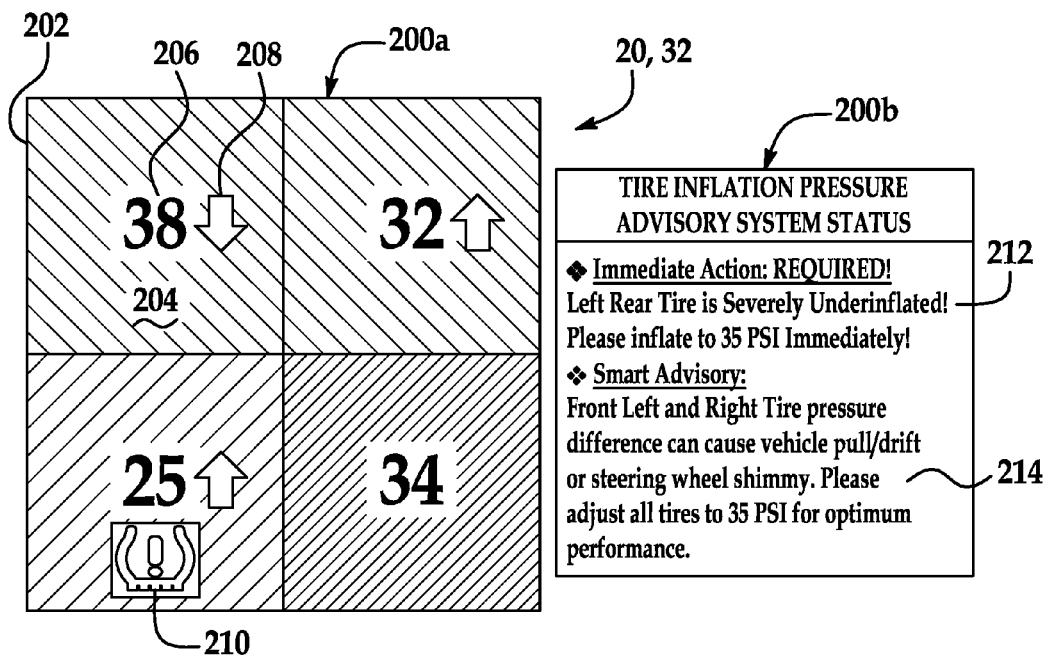

Moreover, as shown throughout FIGS. 10-12, if the vehicle 10 is identified as being in either the warning state or the advisory state with respect to a particular tire 40, each of the corresponding sectors 202 can additionally show an appropriate symbol 208 in the foreground of the background display 204 to output an instruction according to operations S106c and S132c for adjusting the inflation pressure of the tire 40 into the optimum pressure range so that the vehicle 10 will exhibit optimum performance characteristics. According to the illustrated examples, for instance, the symbol 208 may be an up arrow to output an instruction to adjust the inflation pressure of a tire 40 upward into the optimum pressure range, and a down arrow to output an instruction to adjust the inflation pressure of a tire 40 downward into the optimum pressure range.

In another non-limiting example, the background display 204 for each of the corresponding sectors 202 could generally be controlled to continuously show a standard background hue for the displays 20 and 32. Each of the sectors 202 can show a numeric value 206 to output the inflation pressure of a corresponding tire 40 in the foreground of the background display 204, in accordance with operations S106b, S132a and S144a, as described above. Furthermore, in this example, the hue of the numeric value 206 shown may be changed in accordance with the respective operations S106, S132 and S144 to indicate whether the vehicle 10 is in the warning state, the advisory state or the optimum state with respect to a particular tire 40. For instance, the hue of the numeric value 206 shown may be red in accordance with operation S106 to indicate that the vehicle 10 is in the warning state with respect to a particular tire 40, the hue of the numeric value 206 shown may be yellow in accordance with operation S132 to indicate that the vehicle 10 is in the advisory state with respect to a particular tire 40, and the hue of the numeric value 206 shown may be green, for example, or a standard secondary hue for the displays 20 and 32 in accordance with operations S144 to indicate that the vehicle 10 is in the optimum state with respect to a particular tire 40.

Alternatively or additionally to changing the hue of the numeric value 206 shown to indicate whether the vehicle 10 is in the warning state, the advisory state or the optimum state with respect to a particular tire 40, in a similar manner, the hue of the symbol 208 shown in the foreground of the background display 204 may be changed in accordance with the respective operations S106 and S132 to indicate whether the vehicle 10 is in the warning state or the advisory state with respect to a particular tire 40.

As shown in FIG. 12, if the vehicle 10 is identified as being in the warning state with respect to a particular tire 40, the corresponding sector 202 can additionally show a telltale 210 in the foreground of the background display 204 to output a warning of low tire inflation pressure in accordance with operation S106a. As shown, the telltale 210 can be similar in appearance to the malfunction indicator light 24. According to this example, it is contemplated that the telltale 210 can be shown in satisfaction of TPMS requirements in lieu of actuating the malfunction indicator light 24. Alternatively, it will be understood that the telltale 210 can be shown in addition to actuating the malfunction indicator light 24 if the vehicle 10 is identified as being in the warning state.

Figure 9:
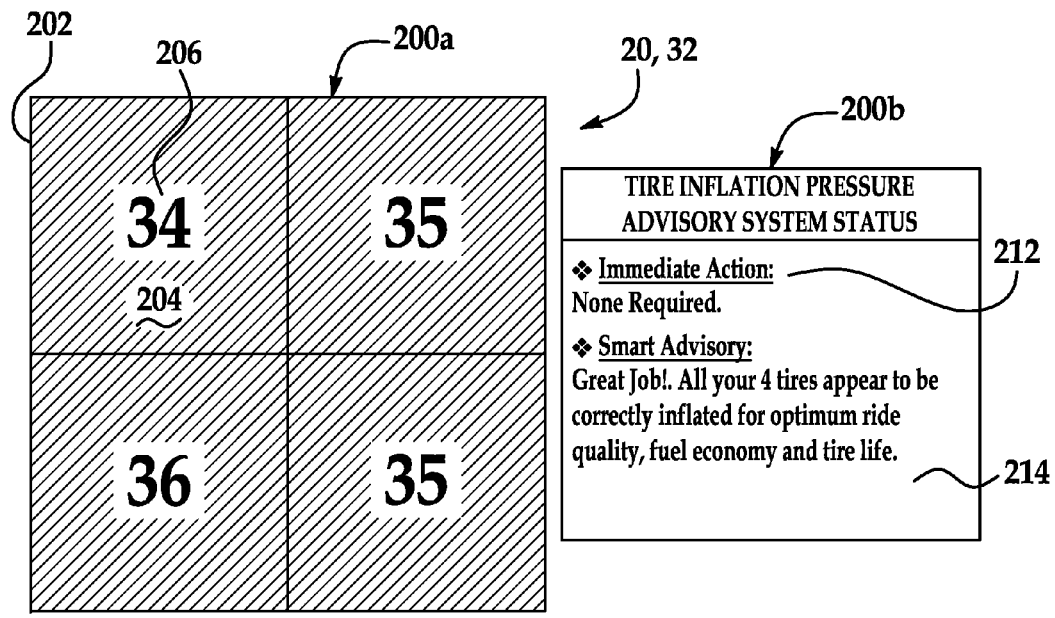
FIGS. 9-12 show example display configurations for the displays during implementation of the tire inflation pressure advisory system according to the flow diagrams of FIGS. 6-8.

As shown in FIG. 9, it will be understood that the optimum state indication can be output in accordance with operation S144 in part through the absence of showing a symbol 208 to output an instruction according to operations S106c and S132c for adjusting the inflation pressure of the tire 40 into the optimum pressure range or a telltale 210 to output a warning of low tire inflation pressure in accordance with operation S106a.

The second field 200b can show text 212 and text 214 to output aspects of the warning state indication, the advisory state indication and the optimum state indication in greater detail. The second field 200b can show the text 212 to output information concerning immediate action, if any, required as a result of the vehicle 10 being identified as being in the warning state with respect to a particular tire 40. As shown in FIG. 12, for example, if immediate action is required, the text 212 can be configured to output an instruction according to operation S106c for adjusting the inflation pressure of the tire 40 into the optimum pressure range so that the vehicle 10 will exhibit optimum performance. Alternatively, if the vehicle 10 is not identified as being in the warning state, the text 212 can be configured to output an instruction that no immediate action is required, as shown in FIGS. 9-11.

The second field 200b can show the text 214 to output information concerning the action recommended when the vehicle 10 is identified as being in the advisory state with respect to a particular tire 40. As shown in FIGS. 10-12, for example, the text 214 can be configured to output an instruction according to operation S132c for adjusting the inflation pressure of the tire 40 into the optimum pressure range so that the vehicle 10 will exhibit optimum performance. In addition, the text 214 can be configured to output a description according to operation 132b of the one or more undesirable performance characteristics that the vehicle is exhibiting because the inflation pressure of the tire 40 is within the advisory pressure range. Alternatively, as shown in FIG. 9, if the vehicle 10 is not identified as being in the warning state or the advisory state, the text 214 can be configured to output a description of the one or more optimum performance characteristics that the vehicle is exhibiting because the inflation pressure of the tire 40 is within the optimum pressure range according to operation S144b.

The hue of the text 212 and/or the text 214 could be a standard secondary hue for the displays 20 and 32. Alternatively, the hue of the text 212 and/or the text 214 could be matched to the hue of the background display 204, the hue of the numeric value 206 and/or the symbol 208 shown in the foreground of the background display 204 according to one or more of the operations S106, S132 and S144 described above.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tire pressure optimization system for a vehicle, comprising:
   a display; and
   a controller in communication with the display, the controller programmed to:
   receive inflation pressure information indicative of a vehicle tire's inflation pressure,
   identify an operating state of the vehicle as being:
   in an optimum state when the inflation pressure information indicates the inflation pressure is within an optimum pressure range, the optimum pressure range indicative of one or more optimum performance characteristics,
   in a warning state when the inflation pressure information indicates the inflation pressure is above a warning high pressure threshold or below a warning low pressure threshold, or
   in an advisory state when the inflation pressure information indicates the inflation pressure is within an advisory pressure range, the advisory pressure range indicative of an undesirable performance characteristic and outside of the warning state and the optimum state, and operate the display to output:
an optimum state indication when the operating state is in the optimum state, the optimum state indication including a description of at least one of the one or more optimum performance characteristics,
a warning indication when the operating state is in the warning state, and
an advisory indication when the operating state is in the advisory state.

2. The system of claim 1, wherein the advisory indication includes a directional instruction for adjusting the inflation pressure up or down to change the operating state from the advisory state to the optimum state.

3. The system of claim 1, wherein the advisory indication includes a description of the undesirable performance characteristic.

4. The system of claim 3, wherein the undesirable performance characteristic is at least one of a ride characteristic, an efficiency characteristic or a tire wear characteristic.

5. The system of claim 1, wherein:
when the inflation pressure information indicates the inflation pressure is below the warning low pressure threshold, the warning indication includes a warning of low tire inflation pressure, and
when the inflation pressure information indicates the inflation pressure is above the warning high pressure threshold, the warning indication includes a warning of high tire inflation pressure.

6. The system of claim 1, wherein the warning indication includes a directional instruction for adjusting the inflation pressure up or down to change the operating state from the warning state to the optimum state.

7. A vehicle, comprising:
a tire;
a device for detecting the tire's inflation pressure and communicating inflation pressure information indicative of the tire's inflation pressure;
a display; and
a controller in communication with the device and the display, the controller programmed to:
identify an operating state of the vehicle as being:
in an optimum state when the inflation pressure information indicates the inflation pressure is within an optimum pressure range, the optimum pressure range indicative of optimum performance,
in a warning state when the inflation pressure information indicates the inflation pressure is above a warning high pressure threshold or below a warning low pressure threshold, or
in an advisory state when the inflation pressure information indicates the inflation pressure is within an advisory pressure range, the advisory pressure range indicative of an undesirable performance characteristic and outside of the warning state and the optimum state, and
operate the display to output:
an optimum state indication when the operating state is in the optimum state,
a warning indication when the operating state is in the warning state, and
an advisory indication when the operating state is in the advisory state, the advisory indication including a directional instruction for adjusting the inflation pressure up or down to change the operating state from the advisory state to the optimum state.

8. The vehicle of claim 7, wherein the advisory indication includes a description of the undesirable performance characteristic.

9. The vehicle of claim 8, wherein the undesirable performance characteristic is at least one of a ride characteristic, an efficiency characteristic or a tire wear characteristic.

10. The vehicle of claim 7, wherein:
when the inflation pressure information indicates the inflation pressure is below the warning low pressure threshold, the warning indication includes a warning of low tire inflation pressure, and
when the inflation pressure information indicates the inflation pressure is above the warning high pressure threshold, the warning indication includes a warning of high tire inflation pressure.

11. The vehicle of claim 7, wherein warning indication includes a directional instruction for adjusting the inflation pressure up or down to change the operating state from the warning state to the optimum state.

12. A vehicle, comprising:
a plurality of tires;
a plurality of devices for detecting inflation pressure, each device being associated with one of the plurality of tires, detecting the associated tire's inflation pressure, and communicating inflation pressure information indicative of the associated tire's inflation pressure,
a display; and
a controller in communication with the plurality of devices and the display, the controller programmed to:
calculate a pressure differential using inflation pressure information from two of the plurality of tires;
identify an operating state of the vehicle as being:
in an optimum state when the pressure differential indicates optimum performance and is less than an optimum pressure differential, or
in an advisory state when the pressure differential indicates an undesirable performance characteristic and is greater than an optimum pressure differential, and
operate the display to output:
an optimum state indication when the operating state is in the optimum state, and
an advisory indication when the operating state is in the advisory state.

13. The vehicle of claim 12, wherein the advisory indication includes an instruction for adjusting the inflation pressure of at least one tire to change the operating state from the advisory state to the optimum state.

14. The vehicle of claim 12, wherein the advisory indication includes a description of the undesirable performance characteristic.

15. The vehicle of claim 14, wherein the undesirable performance characteristic is at least one of a ride characteristic, an efficiency characteristic or a tire wear characteristic.

16. The vehicle of claim 12, wherein the controller is further programmed to operate the display to output:
an inflation pressure indication for each of the plurality of tires, and
an operating state indication, the operating state indication including a background display indicative of the operating state, with the inflation pressure indication being a foreground display on the background display.

17. The vehicle of claim 12, further comprising:
an output device comprising at least one of an audio device and a second display, wherein the controller is further programmed to:
when the operating state is in the advisory state, operate the output device to output a second advisory indication including at least one of a description of the undesirable performance characteristic and an instruction for adjusting the inflation pressure of at least one tire to change the operating state from the advisory state to the optimum state.

* * * * *